United States Patent [19]

Yoshida

[11] Patent Number: 5,086,472
[45] Date of Patent: Feb. 4, 1992

[54] CONTINUOUS SPEECH RECOGNITION APPARATUS

[75] Inventor: Kazunaga Yoshida, Tokyo, Japan

[73] Assignee: NEC Corporation, Tokyo, Japan

[21] Appl. No.: 464,084

[22] Filed: Jan. 12, 1990

[30] Foreign Application Priority Data

Jan. 12, 1989 [JP] Japan .................................. 1-6185

[51] Int. Cl.$^5$ ............................................... G10L 5/00
[52] U.S. Cl. ....................................................... 381/43
[58] Field of Search .................................... 381/41–43; 364/513.5

[56] References Cited

PUBLICATIONS

S. E. Levinson, Structural Methods in Automatic Speech Recognition, Nov. 1985, Proceedings of the IEEE, vol. 73, No. 11.
"C. Grammars, Cl. Formal Grammars", The Handbook of Artificial Intelligence, vol. I Edited by A. Barr et al., HenrisTech Press.
"D. Parsing, D1. Overview of Parsing Techniques", The Handbook of Artificial Intelligence, vol. I Edited by A. Barr et al., HenrisTech Press.

*Primary Examiner*—Emanuel S. Kemeny
*Attorney, Agent, or Firm*—Sughrue, Mion, Zinn Macpeak & Seas

[57] ABSTRACT

A conventional speech recognition network finite-state automaton, which follows regular grammar rules, is improved by adding subnetworks tapped into the original network at call and return points, whereby context-free grammar rules may be used, with avoidance of infinite loop response of a recurrent expression. A continuous speech recognition apparatus includes a standard pattern memory for storing standard patterns, a distance calculating section for calculating distances between frames of an input speech pattern and the standard patterns, an accumulation value calculating section for calculating accumulation values of the distances on matching paths which cause frames of the speech pattern and the standard patterns to correspond to each other, an accumulation value memory for storing the accumulation values, a return point member for storing an address of a return point of a subnetwork in correspondence with the same address as that of the accumulation value memory, a call processing section for writing a minimum value of the accumulation values at a plurality of call points for the subnetwork as an initial value of the accumulation value for the subnetwork in the accumulation value memory and writing an address of a return point corresponding to the call point yielding the minimum value in the return point memory as an initial value, and a return processing section for writing an accumulation value at a terminal point of the subnetwork in the accumulation value memory addressed by the return point address stored in the return point memory at the terminal point of the subnetwork.

6 Claims, 5 Drawing Sheets

CONTINUOUS SPEECH RECOGNITION APPARATUS

BACKGROUND OF THE INVENTION

The present invention relates to an improvement in a continuous speech recognition apparatus for recognizing continuous speech which is uttered continuously.

As a conventional method of recognizing continuously uttered speech in accordance with a predetermined grammar, a method described in a paper entitled "Structural Methods in Automatic Speech Recognition" (by Stephen E. Levinson, Proceeding of the IEEE, Vol. 73, No. 11, Nov. 1985, pp. 1625-1650) is known (hereinafter referred to as "reference 1"). In the above method, continuous speech is recognized by Dynamic Programming (DP) matching on the basis of standard patterns in units of words which are coupled according to a finite-state automaton representing the regular grammar. According to this method, continuous speech can be recognized by an appropriate calculation amount. As another method of recognizing continuous speech according to the finite-state automaton, a method of using a "Hidden Markov Model" (hereinafter to be referred to as an "HMM") described in "D. PARSING, D1. Overview of Parsing Techniques" (The Handbook of Artificial Intelligence, Vol. I, edited by A. Barr et al., Heuris Tech Press, pp. 256-262) is also known (herinafter referred to as "reference 2"). Continuous speech recognition can be realized by using a Viterbi algorithm, as described on Page 46 of reference 2.

A case will be described below wherein continuous speech is recognized by frame-synchronization DP matching using the grammar expressed by the finite-state automaton described in the reference 1. The basic processing sequence of the method using the HMM described in the reference 2 is the same as that in the reference 1, and can be executed in the same manner as in the reference 1. A case will be described below wherein a word is used as a recognition unit. However, a unit other than a word, e.g., a phoneme may be used, as a matter of course.

An input speech pattern (input pattern) can be expressed by a time series of features:

$$A = a_1, a_2, \ldots a_i, \ldots a_I \quad (1)$$

If a word to be recognized is represented by n, a standard pattern can be expressed by:

$$B_n = b_{n1}, b_{n2}, \ldots b_{nj}, \ldots b_{nJn} \quad (2)$$

A distance between a feature $a_i$ of the input pattern and a feature $b_{nj}$ of the standard pattern is given by $d(n;i,j)$. In word-level processing, a DP recurrence formula for the following accumulation value g is solved to calculate an inter-word distance. At the same time, a path value L is calculated to back-trace a recognition result obtained when continuous speech recognition is performed.

Initial Values: $g(m;i,0) = 0$ (3)
$L(n;i,0) = 1$ $$g(n;i,j) = d(n;i,j) + \quad (4)$$

$$\min[g(n;i-1,j), g(n;i-1,j-1), g(n;i-1,j-2)]$$

-continued

| [1] $L(n;i,j)$ | = | $L(n;i-1,j)$ | (5) |
| [2] | | $L(n;i-1,j-1)$ | |
| [3] | | $L(n;i-1,j-2)$ | |

[x] in formulas (5) represents that the corresponding formula is selected when an xth accumulation value in the processing of min[] in formula (4) is the minimum. An inter-word distance in a frame i of the input pattern is obtained as $g(n;i,Jn)$. A frame at the start point of the input pattern with respect to the standard pattern at that time is obtained as the path length $L(n;i,Jn)$. In formulas (3), 0 is given as an initial value of the accumulation value. However, in sentence-level processing, if an accumulation value of an immediately preceding word is given according to the finite-state automaton, and a word-level recognition result is preserved, continuous speech recognition can be performed.

The regular grammar is insufficient to process complexity of a natural language, and it is preferable to use a context-free grammar which has a higher power of expression. In the context-free grammar, the left-hand side of a generation rule consists of one nonterminal symbol, as described in "C. GRAMMARS, C1. Formal Grammars" (The Handbook of Artificial Intelligence, Vol. I edited by A. Barr et al., Heuris Tech Press, pp. 239-244) (to be referred to as a reference 3 hereinafter). For example, the context-free grammar for generating a certain sentence will be exemplified below.

<sentence> $S \rightarrow$ <noun> $N$ <verb phrase> $VP$
$VP \rightarrow$ <verb> $V$ <noun> $N$
$N \rightarrow$ "boys"
$N \rightarrow$ "apples"
$V \rightarrow$ "eat"

Thus, a sentence "boys eat apples" can be generated. The context-free grammar has a characteristic feature capable of using a recurrent generation rule as compared to the regular grammar.

A method of recognizing continuous speech using the context-free grammar is already available. For example, a CYK method, an Earley method, and the like are described on p. 128 and subsequent pages in the reference 2.

When continuous speech is to be recognized, in the method using the finite-state automaton described in the reference 1, a grammar to be expressed is limited to the regular grammar. When the context-free grammar is developed to the finite-state automaton, if a generation rule includes the following recurrent expressions, a network is infinitely generated, and such expressions cannot be processed:

$S \rightarrow aSb$ $S \rightarrow ab$

In this manner, in the conventional method using the finite-state automaton, the context-free grammar having a higher power of expression cannot be used to express a natural language.

According to the CYK method or the Earley method described in the reference 2, the context-free grammar can be processed. However, the amount of calculation required is considerably large.

SUMMARY OF THE INVENTION

It is therefore an object of the present invention to provide a high-performance continuous speech recognition apparatus which can process the context-free grammar in a processing amount equivalent to that of a method using a finite-state automaton.

According to a first aspect of the present invention, there is provided a continuous speech recognition apparatus for recognizing continuous speech by coupling standard patterns in units of predetermined recognition units in accordance with a predetermined network which includes subnetworks inserted between predetermined call and return points in the network, comprising a standard pattern memory for storing the standard patterns, a distance calculating section for calculating distances between frames of an input speech pattern and the standard patterns, an accumulation value calculating section for calculating accumulation values of the distances on matching paths which cause frames of the speech pattern and the standard patterns to correspond to each other, an accumulation value memory for storing the accumulation values, a return point memory for storing an address of the return point of the subnetwork in correspondence with the same address as that of the accumulation value memory, a call processing section for writing a minimum value of the accumulation values at a plurality of call points for the subnetwork as an initial value of the accumulation value for the subnetwork in the accumulation value memory and writing an address of a return point corresponding to the call point yielding the minimum value in the return point memory as an initial value, and a return processing section for writing an accumulation value at a terminal point of the subnetwork in the accumulation value memory addressed by the return point address stored in the return point memory at the terminal point of the subnetwork.

In addition to the first aspect of the present invention, in a continuous speech recognition apparatus according to a second aspect of the present invention, the return processing section writes accumulation values and addresses of return points as initial values of N (N is an arbitrary number not less than 1) areas of the subnetwork prepared in the accumulation value memory and the return point memory for N smaller candidates selected from the accumulation values at a plurality of call points for the subnetwork.

In addition to the second aspect of the present invention, a continuous speech recognition apparatus according to a third aspect of the present invention further comprises a candidate number table for designating the number N of candidates of accumulation values in units of subnetworks.

In addition to the first aspect of the present invention, in a continuous speech recognition apparatus according to a fourth aspect of the present invention, the call processing section writes a minimum value of accumulation values at a plurality of call points for the subnetwork, and accumulation values and return point addresses of candidates each of which has a difference from the minimum value of not more than a predetermined value as initial values of areas for the subnetwork prepared in the accumulation value memory and the return point memory.

In addition to the first to fourth aspects of the present invention, a continuous speech recognition apparatus according to a fifth aspect of the present invention further comprises a processing control section for, when there is no accumulation value to be processed in an area of the accumulation value memory corresponding to a partial network defined by the subnetwork and the call and return points, stopping all processing operations for the network.

In addition to the first to fifth aspects of the present invention, a continuous speech recognition apparatus according to a sixth aspect of the present invention further comprises a path value memory for storing a frame of a speech pattern corresponding to a start point of the subnetwork on a matching path at the same address as that of the accumulation value memory, and a return point table for holding the address of the return point, in which the call processing section writes the address of the return point at the start point of the subnetwork in the frame and the return processing section reads out the address of the return point from the frame addressed by the frame held in the path value memory.

The operation of the continuous speech recognition apparatus according to the present invention will be described below. According to the present invention, call and return processing operations to a subnetwork are added to the continuous speech recognition method using the finite-state automaton described in the reference 1, thus allowing a use of the context-free grammar.

Call/return processing to a subnetwork is introduced in the finite-state automaton to expand the automaton to a pushdown automaton. FIG. 5 is a view for explaining the operation of the pushdown automaton. A subnetwork is called at a call branch, and processing is returned from the subnetwork to the previous position of the network at a return branch. The pushdown automaton described above is exactly equivalent to the context-free grammar. However, if this pushdown automaton is applied to a continuous speech recognition method using the finite-state automaton without modifications, if a recurrent call of the subnetwork is present, a network is infinitely generated. Thus, the pushdown automaton cannot be directly applied to the continuous speech recognition method.

According to the first aspect of the present invention, a minimum value of accumulation values of distances at roots of all the call branches (call points) for calling a certain subnetwork is set as an initial value $g(n;i,0)$ of an accumulation value $g$ of the subnetwork in formula (3). In addition, an address of an end of the call branch (return point) yielding the minimum value is substituted in an initial value $m(n;i,0)$ of an address $m$ of the return point. The address $m$ of the return point is calculated as follows in accordance with the calculation result of recurrence formula (4) in the same manner as the path values $L$ in formulas (5) of the paths along which a start frame of the input pattern propagates:

$$[1] \quad m(n;i,j) = m(n;i-1,j) \qquad (6)$$
$$[2] \qquad\qquad\qquad m(n;i-1,j-1)$$
$$[3] \qquad\qquad\qquad m(n;i-1,j-2)$$

At the terminal point of the subnetwork, an address $m(n;i,Jn)$ of the return point yielding a minimum value at the start point is read out, and an accumulation value $g(n;i,Jn)$ is substituted as an initial value $g(k;i,0)$ of the accumulation value $g$ of a network $k$ corresponding to the address.

With this method, processing by the pushdown automaton can be realized without infinitely generating a network in substantially the same calculation amount as in a case wherein the finite-state automaton is used. However, since determination of the minimum value for calculating an initial value of a subnetwork influences selection of a path at the terminal point, the DP principle cannot strictly be established, and a quasi-optimal solution is obtained. Even if a path other than the one for optimizing the entire network is erroneously selected at the start point of a subnetwork, it does not always directly lead to a recognition error. However, the influence caused by this error must be minimized.

In consideration of this respect, according to the second aspect of the present invention, N (N is an arbitrary value equal to or larger than 1) smaller candidates from the minimum value are obtained from the accumulation values of distances at all the call points for calling the subnetworks, and recurrence formulas (4), (5), and (6) in the subnetwork are calculated in units of candidates.

The number of call times varies depending on subnetworks. In this case, as the number of call times is increased, the corresponding subnetwork causes more path selection errors at its start point. In addition to the number of call times, the error frequency is determined by various other causes, e.g., whether or not a similar word is present until calling. Thus, according to the third aspect of the present invention, a table for predetermining the number N of candidates is prepared for each subnetwork. Thus, the number N can be increased for a subnetwork which is apt to cause an error, while the number N can be decreased for a subnetwork which rarely causes an error. As a result, a selection error can be coped with by a minimum increase in calculation amount.

According to the fourth aspect of the present invention, when a subnetwork is called, the number of candidates is not predetermined unlike N, and an accumulation value of a call point which yields a minimum accumulation value, and accumulation values of call points at each of which a difference between its accumulation value and the obtained minimum value is equal to or smaller than a predetermined value T are selected as candidates. Thus, an appropriate number of candidates corresponding to an actual speech pattern can be left. In addition to a reference based on a distance, the maximum number of candidates may be predetermined.

When the number of candidates of subnetworks can be changed in accordance with accumulation values in this manner, an initial value of the accumulation value g may not often be provided to an area for a plurality of candidates of subnetworks. When a subnetwork is called, if a certain call point is not selected, an initial value is never provided to a return point corresponding to the non-selected call point. If no initial value is provided, recurrence formulas (4), (5), and (6) corresponding to a partial network after the subnetwork and the return point need not be calculated.

In addition, when a recurrence formula imposes an inclination limitation on a standard pattern direction, if the following recurrence formula is used, it need not be calculated unless an initial value is continuously provided for a given number of frames after the first initial value is provided:

$$g(n;i,j) = d(n;i,j) + \min[g(n;i-2,j-1), g(n;i-1,j-1), g(n;i-1,j-2)] \quad (7)$$

For example, the given number of frames is $2 \times Jn$ (frames) in recurrence formula (7).

Thus, according to the fifth aspect of the present invention, when a recurrence formula need not be calculated, a calculation of the recurrence formula and lower-order subnetwork call processing in the partial network (including subnetworks) are omitted. More specifically, before an initial value is set for a certain partial network or when the given number of frames has passed after the last initial value is set, all the processing operations for the partial network including a calculation of the recurrence formula can be stopped, thus avoiding wasteful calculations.

In the above description, the address m of the return point is calculated together with the recurrence formula like in formulas (6). However, since the recurrence formula requires a large number of calculation times, a calculation amount of formulas (6) is not negligible. Thus, according to the sixth aspect of the present invention, a return point table M(i) for storing an address of a return point in correspondence with a frame i ($1 \leq i \leq I$) of an input pattern is prepared. At the start point of a subnetwork, the address of a return point is substituted in the return point table M(i). When the recurrence formula is calculated, only the path value L shown in formulas (5) are calculated. At the terminal point of a subnetwork, a frame "is"$=$L (n;i,Jn) corresponding to the start point is read out, the address of the return point is read out from the return point table M(is) using "is", and an accumulation value g(n;i,Jn) is substituted as an initial value g(k;i,0) of a network k with respect to the readout address. Thus, processing upon calculations of the recurrence formula is the same as that in the conventional continuous speech recognition method using the finite-state automaton. The entire processing amount of sentence-level processing is smaller than that of word-level processing, and the processing amount of this method is substantially the same as a conventional one. Thus, a calculation amount can be prevented from being increased.

DESCRIPTION OF THE PREFERRED EMBODIMENTS

An embodiment of a continuous speech recognition apparatus according to the present invention will be described below with reference to the accompanying drawings.

Figure 1:
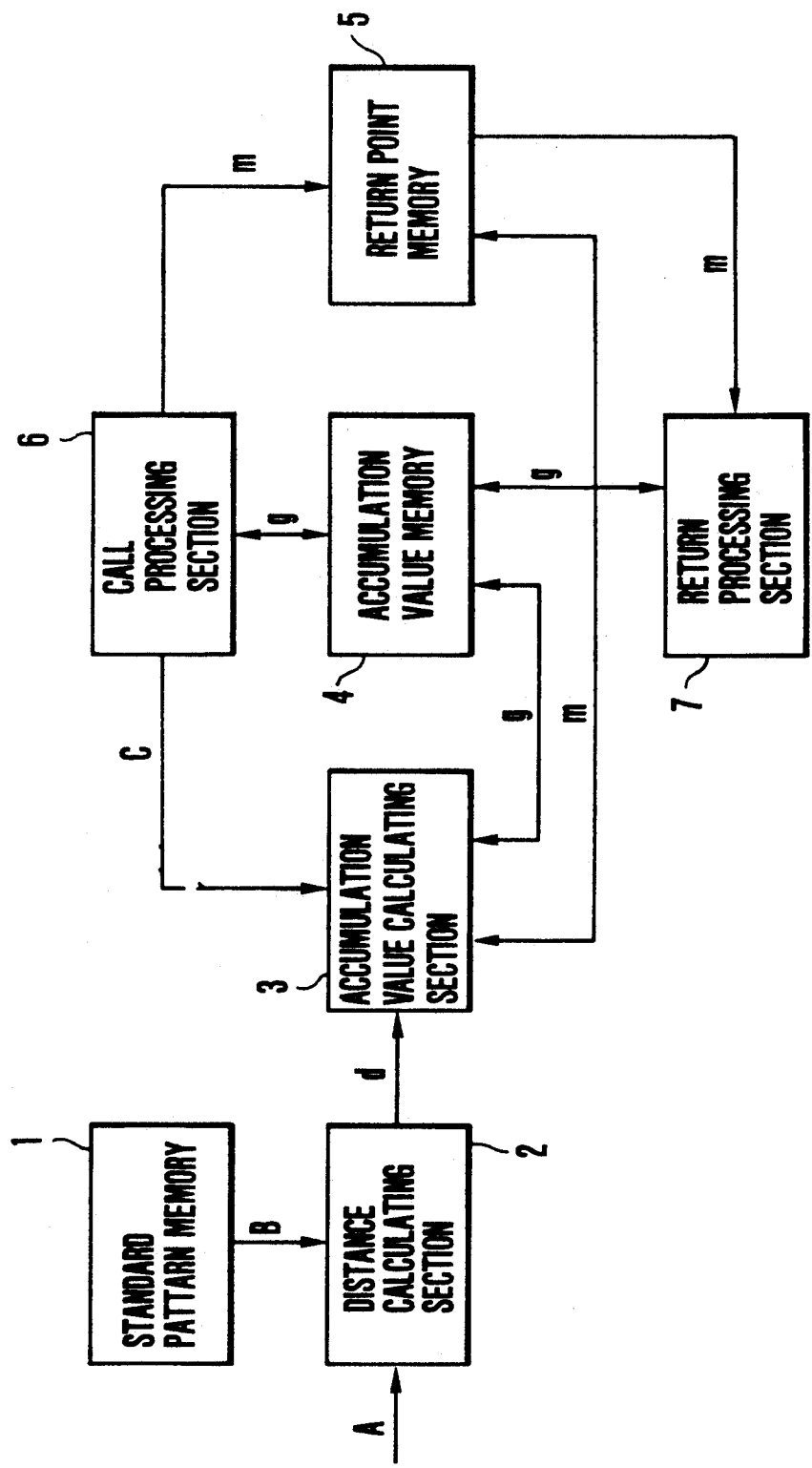
FIG. 1 is a block diagram showing an embodiment according to the first to fifth aspects of the present invention.

FIG. 1 shows an embodiment according to the first to fifth aspects of the present invention.

A standard pattern memory 1 prestores standard patterns B. A distance calculating section 2 reads out a feature $a_i$ of an ith frame of an input pattern A, and a feature amount $b_{nj}$ of a jth frame of a standard pattern $B_n$ of a word n, and calculates and outputs a distance d(n;i,j) between the feature amounts. An accumulation value calculating section 3 calculates recurrence formula (4) using the input distance d. An accumulation value g necessary for calculating the recurrence formula is held in an accumulation value memory 4, and is read out/written by the accumulation value calculating section 3, as needed. Similarly, a return point memory 5 stores addresses m of return points, and the accumulation value calculating section 3 calculates formulas (6) together with the recurrence formula using the addresses m. The above operations are word-level processing, and are the same as those in the conventional continuous speech recognition method by frame-synchronization DP matching described in the reference 1.

Sentence-level processing will be described below. When word-level processing for the ith frame of the input pattern A is completed, a call processing section 6 reads out accumulation values g at call points from the accumulation value memory 4. These values are compared, and the obtained accumulation value g is written in the accumulation value memory 4 as an initial value of a subnetwork. An address m of the return point corresponding to the obtained accumulation value is written in the return point memory 5.

A return processing section 7 reads out the accumulation value g at the terminal point of a subnetwork from the accumulation value memory 4, and reads out the address m of the return point from the return point memory 5. Then, the section 7 writes the readout accumulation value g in the accumulation value memory 4 addressed by the address m.

The sentence-level processing will be described in more detail below. As an example of a grammar, the following generation rule U is used:

$$U \rightarrow m\ P\ n\ P\ k \quad (8)$$

$$P \rightarrow s \quad (9)$$

where m, n, k, and s represent terminal symbols, i.e., standard patterns of words, and P represents a nonterminal symbol. In this example, there is no recurrent call. However, the same processing can be performed if a recurrent call is present.

Figure 2:
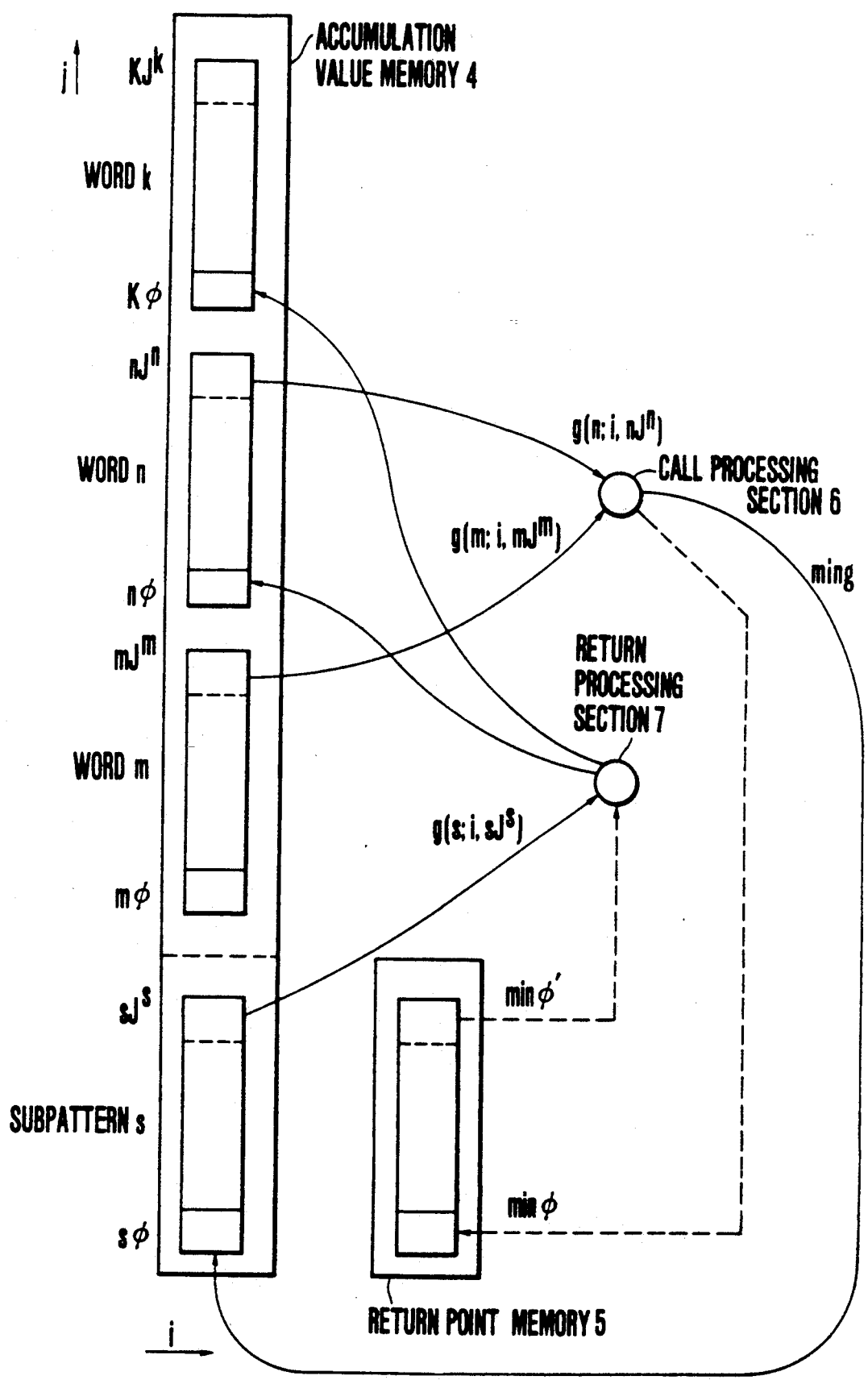
FIG. 2 is a view for explaining sentence-level processing according to the first aspect of the present invention.

The sentence-level processing of the embodiment according to the first aspect of the present invention will be described below. FIG. 2 is a view for explaining sentence-level processing according to the first aspect of the present invention. An accumulation value memory 4 stores the accumulation value g in formula (4), and a return point memory 5 holds the address m of the return point in formulas (6). These memories are the same as the accumulation value memory 4 and the return point memory 5 as in FIG. 1. As shown in FIG. 2, areas of accumulation values g corresponding to the words m, n, k, and s are prepared. Addresses on the accumulation value memory 4 and the return point memory 5 corresponding to the start and terminal points of words are respectively represented by m:ml,$mJ^m$, n:nl,$nJ^n$, k:kl,$kJ^k$, and s:sl,$sJ^s$. Thus, addresses of call points for a subnetwork P are $mJ^m$ and $nJ^n$. The addresses of return points are those whose initial values are substituted in the accumulation value memory 4, and are n0 and k0 corresponding to addresses immediately before the start point.

The call processing section 6 reads out an accumulation value $g(m;i,mJ^m)$ at the call point $mJ^m$ and an accumulation value $g(n;i,nJ^n)$ at the call point $nJ^n$ from the accumulation value memory 4, and compares these values. A minimum value of these values, i.e., a smaller accumulation value ming is written at an address s0 of the accumulation value memory 4 as an initial value g(s;i,s0) of the accumulation value for the subnetwork P. A return point address min0 (n0 or k0) corresponding to the return point providing ming is written at the address s0 of the return point memory 5 as an initial value m(s;i,s0) of the return point address.

The return processing section 7 initially writes a large value in areas of the accumulation value memory 4 corresponding to all the return points n0 and k0 so as to initialize the memory 4. Subsequently, the section 7 reads out a return point address m(s;i,$sJ^s$)=min0' at the terminal point $sJ^s$ of the subnetwork P from the return point memory 5. The section 7 also reads out an accumulation value g(s:$sJ^s$) at the terminal point from the accumulation value memory 4, and writes it at the position of the already readout return point address min0' in the accumulation value memory 4. In this manner, sentence-level processing is completed.

Figure 3:
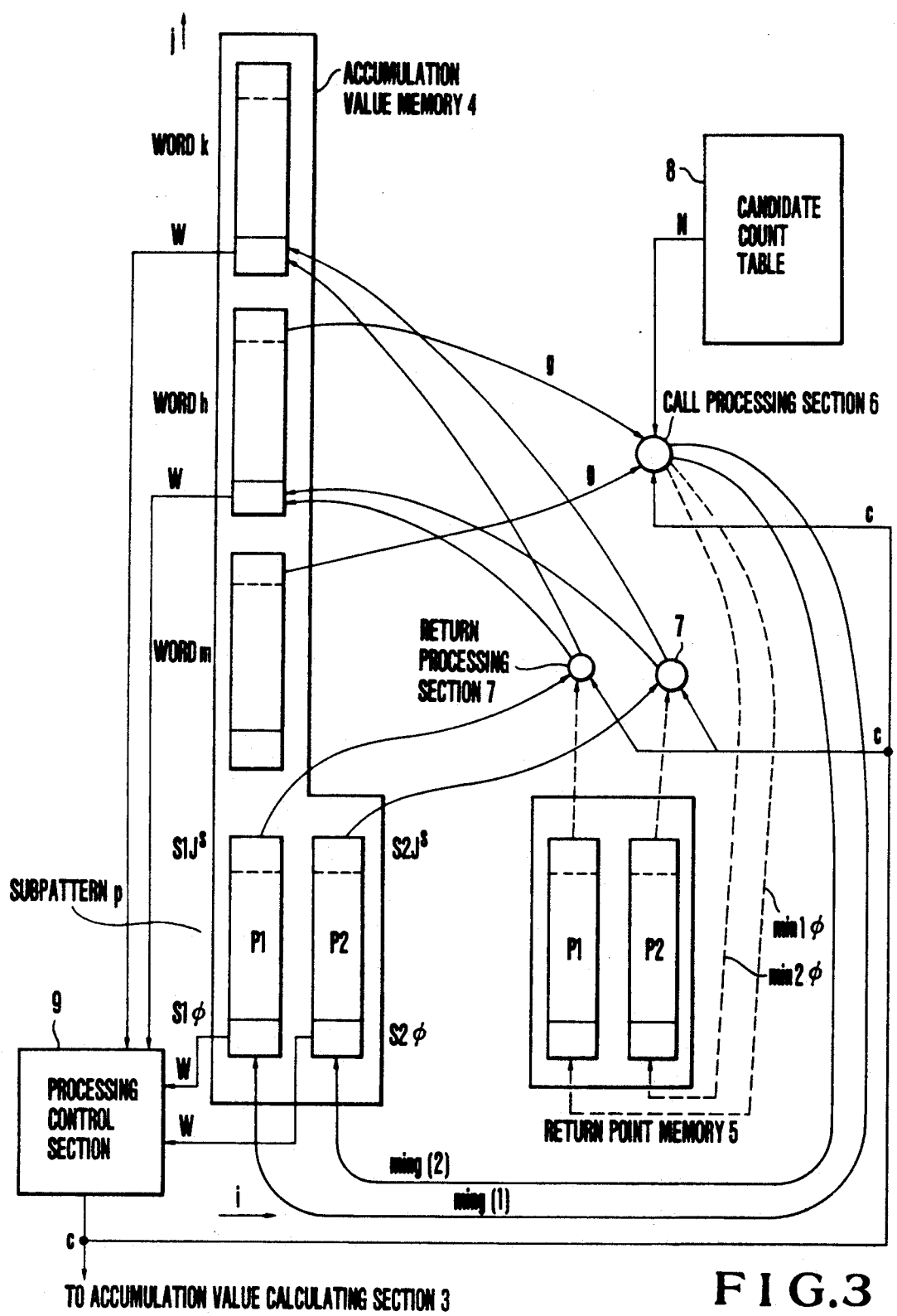
FIG. 3 is a view for explaining sentence-level processing according to the second to fifth aspects of the present invention.

Sentence-level processing of an embodiment according to the second aspect of the present invention will be described below. FIG. 3 is a view for explaining the sentence-level processing according to the second to fifth aspects of the present invention. According to the second aspect of the present invention, a plurality of areas are prepared in the accumulation value memory 4 and the return point memory 5 for one subnetwork. For example, if paths up to the second largest values are to be preserved, two areas P1 and P2 are prepared for the subnetwork P. Addresses of the areas P1 and P2 on the accumulation value memory 4 and the return point memory 5 corresponding to the start and terminal points of the word s are represented by s10 and s1$J^s$, and s20 and s2$J^s$, respectively.

The call processing section 6 reads out an accumulation value $g(m;i,mJ^m)$ at the call point $mJ^m$ and an accumulation value $g(n;i,nJ^n)$ at the call point $nJ^n$ from the accumulation value memory 4 to select a candidate by comparing these values. In this case, if an Nth smallest accumulation value is represented by ming(N), accumulation values ming(1) and ming(2) up to the second smallest values are selected as candidates. These values are written at the addresses s10 and s20 of the accumulation value memory 4 as initial values g(s;i,s10) and g(s;i,s20) of accumulation values of the areas P1 and P2. In this case, return point addresses min10 and min20 (n0 or k0) corresponding to the return points which provide ming(1) and ming(2) are written in the return point memory 5 as initial values m(s;i,s10) and m(s;i,s20) of return point addresses of the areas P1 and P2. Processing of the return processing section 7 is the same as that according to the first aspect of the present invention.

Sentence-level processing of an embodiment according to the third aspect of the present invention will be described below. According to the third aspect of the present invention, a candidate count table 8 is arranged in addition to the arrangement according to the second aspect of the present invention. When the Nth smallest accumulation value ming(N) is selected from accumulation values g of the call points read out from the accumulation value memory 4 by the call processing section 6, a value held in advance in the candidate count table 8 in units of subnetworks is read out and used as the value N. Other processing operations are the same as those according to the second aspect of the present invention.

Sentence-level processing of an embodiment according to the fourth aspect of the present invention will be described below. According to the fourth aspect of the present invention, a plurality of candidates are selected from accumulation values g of the call points read out from the accumulation value memory 4 by the call processing section 6 as follows. First, a minimum value ming is selected from accumulation values g at call points. Then, values g each of which has a difference, with the minimum value ming, equal to or smaller than a predetermined threshold value T, i.e., satisfies the following relation are selected:

$$g - \text{ming} < T \tag{10}$$

The selected accumulation values g and address values of return points are written in the accumulation value memory 4 and the return point memory 5 as initial values of a plurality of areas for subnetworks. Other processing operations are the same as those according to the second aspect of the present invention.

Sentence-level processing of an embodiment according to the fifth aspect of the present invention will be described below. According to the fifth aspect of the present invention, when initial values are written at start points s10, s20, n0, and k0 of a partial network in the accumulation value memory 4 and the return point memory 5, write information w is output to a processing control section 9. Upon reception of the write information w, the processing control section 9 outputs a control signal c indicating the partial network corresponding to the write information w to the accumulation value calculating section 3, the call processing section 6, and the return processing section 7, thereby instructing start of processing. When the control signal c is input, word-level processing and sentence-level processing for the corresponding partial network are executed. If no processing start instruction by the control signal c is input, these processing operations for the corresponding subnetwork are not executed.

When initial values are set, the processing control section 9 starts counting of the number of input frames in units of partial networks. When no initial value is set for a predetermined count value, processing for the partial network is stopped by the control signal c. Other processing operations are the same as those according to the first to fourth aspects of the present invention.

Figure 4:
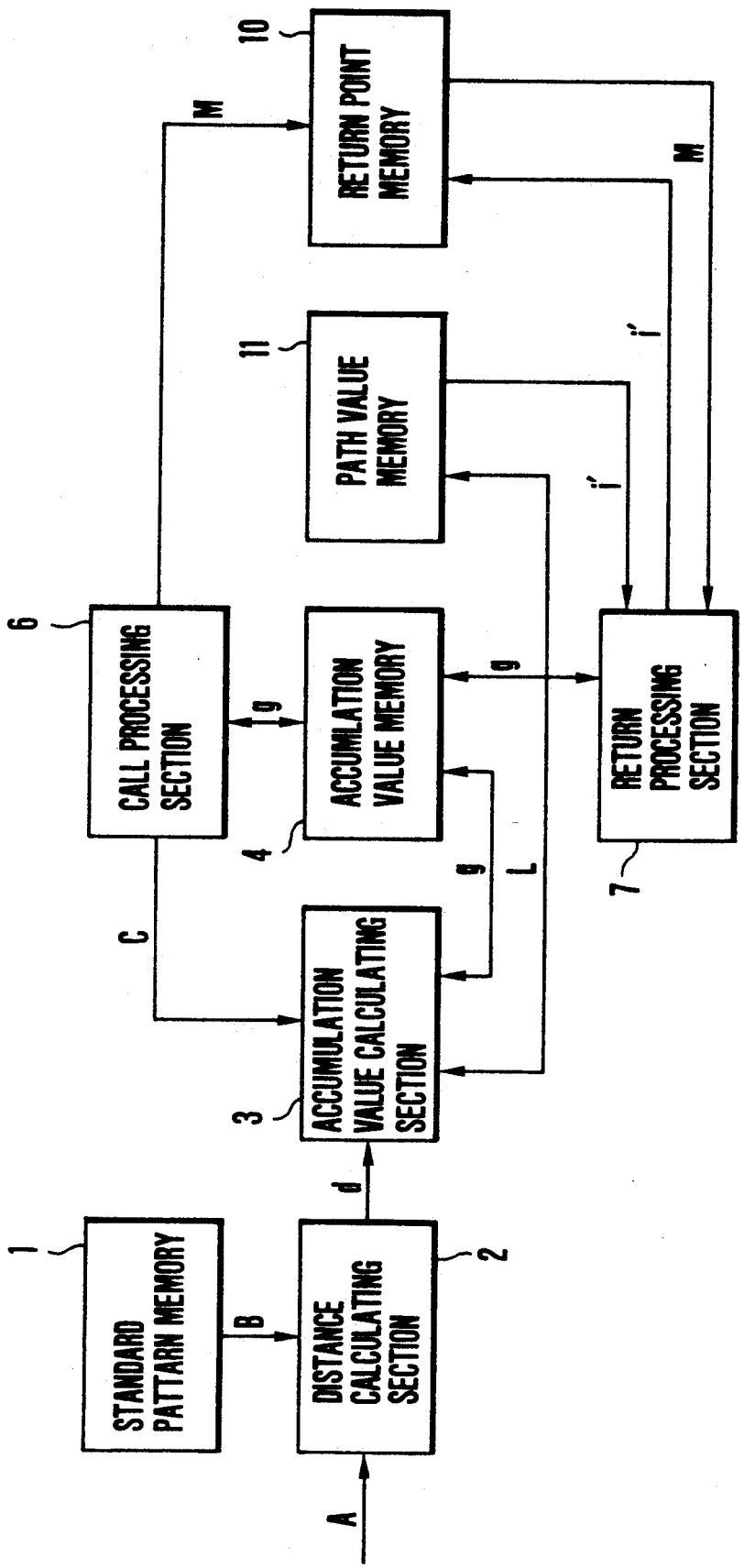
FIG. 4 is a block diagram showing another embodiment according to the sixth aspect of the present invention.
Figure 5:
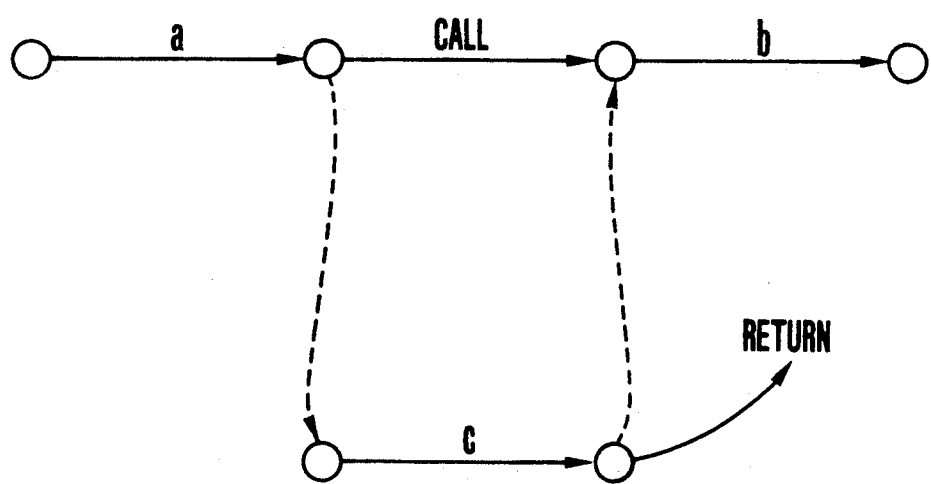
FIG. 5 is a view for explaining an operation of a pushdown automaton.

An embodiment according to the sixth aspect of the present invention will be described below. FIG. 4 shows an embodiment according to the sixth aspect of the present invention. A return point table 10 for holding a return point address M(i) in correspondence with a frame i of an input pattern is prepared. In the frame i, a return point address for a subnetwork P is written in an area of the return point table 10 corresponding to the frame i. In word-level processing, the accumulation value calculating section 3 calculates the recurrence formula (4) and path values L given by formulas (5) using a path value memory 11. These calculations are necessary for obtaining a recognition result in the first to fifth aspects of the present invention like in the conventional method described in the reference 1. The return processing section 7 reads out a frame i' corresponding to the start point of a subnetwork from the path value memory 11 as a path value $L(s;i,sJ^s)$ at the terminal point of the subnetwork. A return point address M(i') is read out from the return point table 10 using the value of the frame i' as an address. An accumulation value $g(s;i,sJ^s)$ at the terminal point of the subnetwork is written at the return point address M(i') in the accumulation value memory 4. Other processing operations are the same as those according to the first to fifth aspects of the present invention.

According to the present invention, a high-performance continuous speech recognition apparatus which can process a context-free grammar with a small calculation amount can be realized.

What is claimed is:

1. A continuous speech recognition apparatus for recognizing continuous speech by coupling standard patterns in units of predetermined recognition units in accordance with a predetermined network which includes subnetworks inserted between predetermined call and return points in said network, said apparatus comprising:

a standard pattern memory for storing the standard patterns;

a distance calculating section for calculating distances between frames of an input speech pattern and the standard patterns;

an accumulation value calculating section for calculating a plurality of accumulation values of distances on matching paths which cause frames of the speech pattern and the standard patterns to correspond to each other;

an accumulation value memory for storing said calculated accumulation values;

a return point memory for storing a plurality of addresses of return points of the subnetwork that correspond to respective ones of said calculated accumulation values in said accumulation value memory;

a call processing section for writing a minimum value of said accumulation values at a plurality of call points for the subnetwork as an initial value of the accumulation value for the subnetwork in said accumulation value memory and writing an address of a return point corresponding to the call point yielding the minimunm value in said return point memory as an initial value; and a return processing section for writing an accumulation value at a terminal point of the subnetwork in said accumulation value memory addressed by the return point address stored in said return point memory corresponding to the terminal point of the subnetwork.

2. An apparatus according to claim 1, wherein said return processing section writes accumulation values and addresses of return points as initial values of N areas of the subnetwork prepared in said accumulation value memory and said return point memory for N smaller candidates selected from the accumulation values at a plurality of call points for the subnetwork, wherein N is a number greater than one.

3. An apparatus according to claim 2, further comprising a candidate number table for designating the number N of candidates of accumulation values in units of subnetworks.

4. An apparatus according to claim 1, wherein said call processing section writes a minimum value of accumulation values at a plurality of call points for the subnetwork, and accumulation values and return point addresses of candidates each of which has a difference from the minimum value of not more than a predetermined value as initial values of areas for the subnetwork prepared in said accumulation value memory and said return point memory.

5. An apparatus according to claim 1, further comprising a processing control section for, when there is no accumulation value to be processed in an area of said accumulation value memory corresponding to a partial network defined by the subnetwork and the call and return points, stopping all processing operations for the network.

6. An apparatus according to claim 1, further comprising a path value memory for storing a frame of a speech pattern corresponding to a start point of the subnetwork on a matching path at the same address as that of said accumulation value memory, and a return point table for holding the address of the return point, in which said call processing section writes the address of the return point at the start point of the subnetwork in the frame and said return processing section reads out the address of the return point from the frame addressed by the frame held in said path value memory.

* * * * *

UNITED STATES PATENT AND TRADEMARK OFFICE
CERTIFICATE OF CORRECTION

PATENT NO. : 5,086,472
DATED : February 4, 1992
INVENTOR(S) : Kazunaga Yoshida

It is certified that error appears in the above-indentified patent and that said Letters Patent is hereby corrected as shown below:

```
Col. 1, line 29, delete "herinafter" and insert
       --hereinafter--;

Col. 1, line 66, delete "d(ni,j)" and insert
       --d(n,i,j)--;

Col. 10, line 42, delete "minimuum" and insert
       --minimum--.
```

Signed and Sealed this

Eighth Day of June, 1993

Attest:

MICHAEL K. KIRK

Attesting Officer    Acting Commissioner of Patents and Trademarks